No. 779,273. Patented January 3, 1905.

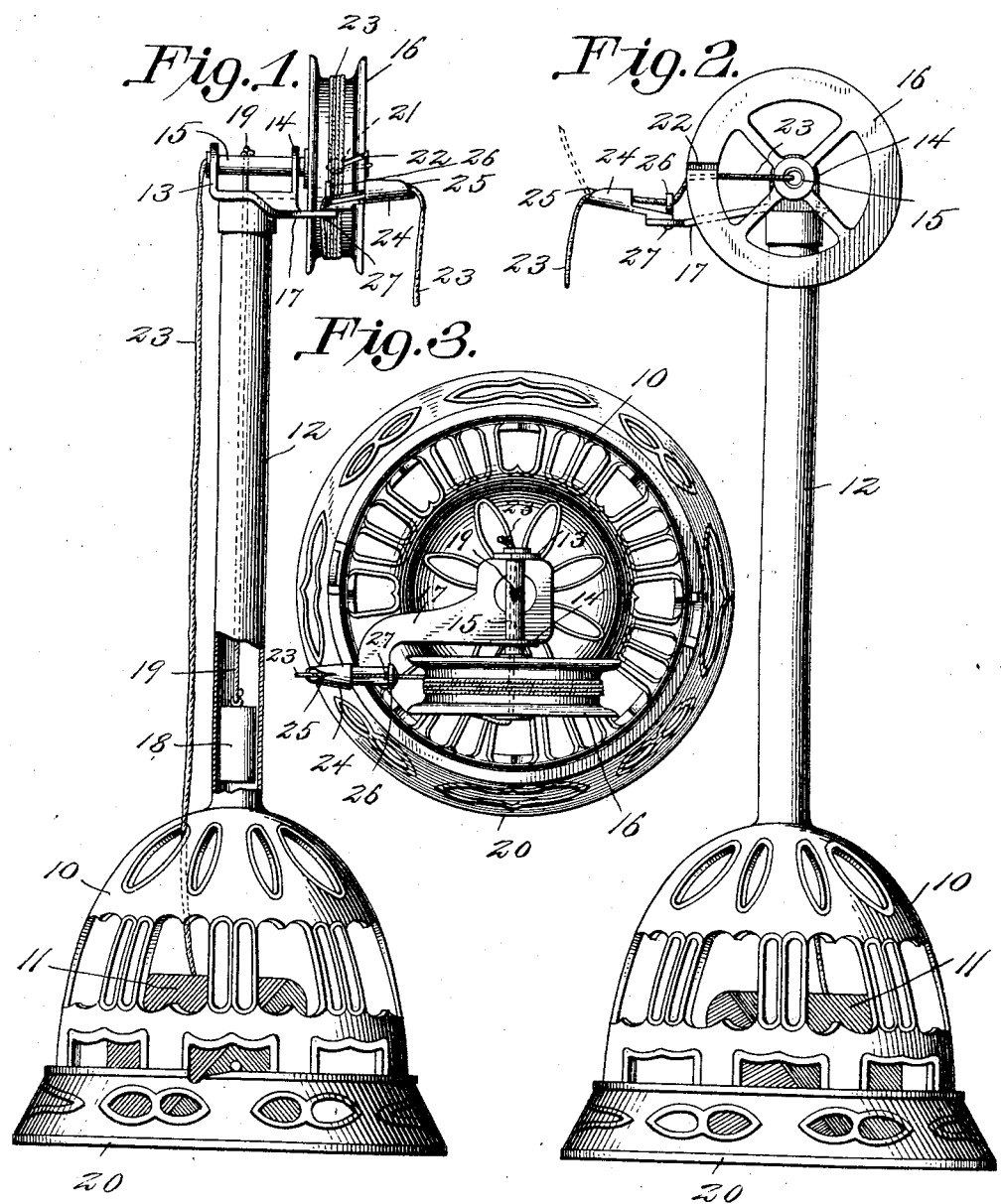

UNITED STATES PATENT OFFICE.

WILLIAM G. FULLER, OF CHICAGO, ILLINOIS.

TWINE-HOLDER.

SPECIFICATION forming part of Letters Patent No. 779,273, dated January 3, 1905.

Application filed March 5, 1904. Serial No. 196,673.

*To all whom it may concern:*

Be it known that I, WILLIAM G. FULLER, a citizen of the United States, residing at Chicago, in the county of Cook and State of Illinois, have invented a new and useful Twine-Holder, of which the following is a specification.

This invention relates to devices for holding wrapping-twine in stores and similar localities, and has for its object to provide a simply-constructed and convenient device of this class wherein provision is made for automatically disposing of the surplus twine which remains after the packages are tied and also preventing the free end of the twine from winding upon the reel and being thereby placed in an inconvenient position for the clerk.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claims made therefor.

In the drawings thus employed, Figure 1 is a front elevation, partly in section. Fig. 2 is a side elevation, and Fig. 3 is a plan view. Fig. 4 is a perspective detail, enlarged, of the combined twine guide and clutch.

In devices of this class as heretofore constructed the tendency is for the free end of the twine to be fully wound upon the reel or drum, and thus placed in an inconvenient position and causing much annoyance to the clerk.

To prevent the free end of the twine from being thus wound upon the reel is the principal object of the present invention, and to accomplish this desirable result advantage is taken of the well-known fact that when twine is rapidly wound upon a reel or drum the free end of the twine is thrown outwardly as it approaches the reel and is about to be wound thereon by disposing a suitable means at the proper point relative to the reel to receive the twine when thus thrown outward and hold it with sufficient firmness to arrest the further motion and maintain the twine in a convenient position for the clerk.

The present invention not only disposes of the loose portion of the twine, but clutches and holds the end in a predetermined position convenient to the hand of the clerk and always in the same position and also prevents the reel-actuating means from overwinding, so that no matter how much surplus twine may extend from the reel the twine will always be caught by the clutch means at substantially the same distance from its free end.

In the mechanism devised for carrying out the principles of the invention is embraced a receiver 10 for the ball of twine 11; a hollow standard 12, carrying spaced bearings 13 14; a tubular spindle or shaft 15, mounted for rotation in the bearings and carrying a reel or drum 16 for the surplus twine; an arm 17, extending from the standard and carrying the combined twine clutch and guide to be presently described, and a counterweight 18, movable in the hollow standard and having a winding cord or cable 19 connected for winding on the shaft 15.

The receptacle 10 may be of any approved form and with any desired means for introducing the ball of twine and with the standard 12 disposed in any desired position relative thereto.

For the purpose of illustration an ordinary form of twine-receptacle is shown having a detachable bottom 20 and with the standard extending upwardly therefrom; but these parts may be varied in form and proportions to any desired extent or as taste and circumstances may require.

The reel 16 is provided with an aperture 21 at one point through its rim, with an inclined cleft 22 leading from the aperture through the side of the reel.

The twine 23 is fed through the hollow shaft 15 and thence inserted into the aperture 21 through the cleft 22, the cleft enabling the twine to be quickly inserted into the aperture without the necessity for threading it through the aperture. Thus the installing of a new ball of twine is materially expedited.

The twine is wound a number of times around the reel, and when the free end is drawn outwardly by the clerk the first result is to unwind the twine which has been wound upon the reel, and when that is exhausted the twine may be drawn directly from the ball to any desired extent, as will be obvious.

The act of drawing outward on the twine, and thereby rotating the reel, winds the cord 19 upon the shaft 15 and elevates the counterweight 18, and when the twine is severed and released after the package has been tied the counterweight in falling rewinds the surplus twine upon the reel again ready for the next using of the same.

The clutch means above referred to for catching the free end of the twine and preventing its being wound entirely upon the reel consists of a tubular member 24, preferably swiveled at 27 upon the arm 17, opposite the face of the reel 16, and formed with a V-shaped recess 25 and into which the twine is thrown when being wound upon the reel and caught and retained thereby.

The outer free end of the clutch member is preferably inclined backwardly or toward the reel and serves the twofold purpose of a clutch to catch and hold the twine and also to guide the same and maintain it in proper position relative to the reel.

The clutch member will preferably be mounted to swing upon the arm 17 so that it will swing laterally to enable the twine to be drawn from any direction without affecting the operation. This is a very important advantage, as by this simple means the twine may be carried in any desired direction from the device.

An additional guide member 26 will preferably be attached to the clutch member and spaced from its rear end to increase the extent of the guiding means and reduce the tendency to the displacement of the twine when moving rapidly through the guide.

The member 26 is preferably of resilient material, with the ends overlapping, so that the twine may be inserted by forcibly drawing it over the member, and thereby compressing one side and entering the twine, as will be obvious. This also materially reduces the labor of installing the twine in the device. By this simple means it will be obvious that a very simple, convenient, and practical device is produced admirably adapted for the purposes described.

Having thus described the invention, what is claimed is—

1. In a device of the class described, a reel or drum having means for winding the loose twine thereon, and a clutch associated with the reel or drum for automatic engagement with the twine when the same is moved into the clutch under the winding action of the reel.

2. In a device of the class described, a reel or drum having means for winding the loose twine thereon, a guide for the twine, and a clutch associated with the guide for automatic engagement with the twine when the same is moved into the clutch under the winding action of the reel.

3. In a device of the class described, a reel or drum having means for winding the loose twine thereon, and a swinging clutch associated with the reel and drum and disposed for automatically engaging the twine when the latter is moved into the clutch under the winding action of the reel.

4. In a device of the character described, a supporting-standard, a reel or drum mounted for rotation on said standard, an arm extending from said standard, and a clutch carried by said arm for automatically engaging said twine when the same is moved into the clutch under the winding action of the reel.

5. In a device of the character described, a supporting-standard, a reel or drum mounted for rotation on said standard, an arm extending from said standard, and a clutch mounted to swing upon said arm for automatically engaging said twine when the same is moved into the clutch under the winding action of the reel.

6. In a device of the class described, a reel or drum having means for winding the loose twine thereon, an arm extending in the path of the twine, and a twine-guiding means mounted to swing upon said arm transversely of the path of the twine.

7. In a device of the class described, a reel or drum having means for winding the loose twine thereon, an arm extending in the path of the twine, and a twine-guiding means having a clutch means associated therewith and mounted to swing transversely of the path of the twine.

8. In a device of the class described, a hollow standard, a hollow shaft supported for rotation upon said standard and carrying a twine-receiving reel or drum, a weight movable in said standard and connected by cable to said shaft, and a twine-guiding means connected to said standard and extending into the path of the twine.

9. In a device of the class described, a hollow standard, a hollow shaft supported for rotation upon said standard and carrying a twine-receiving reel or drum, a weight movable in said standard and connected by cable to said shaft, and a clutch associated with the reel or drum for automatic engagement by the twine when the same is moved by the rotation of the reel under the influence of the weight.

10. In a device of the class described, a hollow standard, a hollow shaft supported for rotation upon said standard and carrying a twine-receiving reel or drum, a weight movable in said standard and connected by cable to said shaft, an arm extending from said standard, and a guiding means for the twine carried by said arm.

11. In a device of the class described, a hollow standard, a hollow shaft supported for rotation upon said standard and carrying a twine-receiving reel or drum, a weight movable in said standard and connected by cable to said shaft, an arm extending from said standard, and a guiding means for the twine mounted to swing on said arm.

12. In a device of the class described, a hollow standard, a hollow shaft supported for rotation upon said standard and carrying a twine-receiving reel or drum, a weight movable in said standard and connected by cable to said shaft, an arm extending from said standard, a clutch carried by said arm for engagement by the twine when moved by rotation of the reel.

13. In a device of the class described, a receptacle for the ball of twine, a hollow standard associated with said receptacle, a hollow shaft mounted for rotation upon said standard and carrying a twine-receiving reel, a weight movable in said hollow standard and connected to said shaft by a cable, an arm extending from said standard, and a clutch carried by said arm for automatic engagement by said twine when moved by rotation of the reel.

14. In a device of the class described, a reel or drum having means for winding the loose twine thereon, and a clutch formed with a V-shaped recess between whose converging sides the twine is engaged when moved by rotation of the reel.

15. In a device of the class described, a tubular spindle, a reel mounted for rotation with said spindle and having an aperture in its rim, the twine being adapted for passage through said spindle and aperture and winding upon the reel, means for rotating the reel for winding the loose portion of the twine thereon, and a clutch to automatically grip the twine when moved by rotation of the reel.

16. In a device of the class described, a tubular spindle, a reel mounted for rotation with said spindle and having an aperture in its rim, the twine being adapted for passage through said spindle and aperture and winding upon the reel, a counterbalance applied to rotate the reel, and a clutch for engaging the twine when moved by rotation of the reel.

17. A reel or drum having means for winding the loose twine thereon in combination with a tubular member having a V-shaped recess for guiding the twine and engaging the same when moved by rotation of the reel.

In testimony that I claim the foregoing as my own I have hereto affixed my signature in the presence of two witnesses.

WILLIAM G. FULLER.

Witnesses:
FRANK P. KROMER,
ALFRED E. WINTERROTH.